United States Patent [19]

Bacon

[11] Patent Number: 4,457,086
[45] Date of Patent: Jul. 3, 1984

[54] SNOWBLOWER HAVING IMPROVED AUGER AND TRACTION DRIVE CONTROL

[75] Inventor: Roger J. Bacon, Plymouth, Wis.

[73] Assignee: Gilson Brothers Company, Plymouth, Wis.

[21] Appl. No.: 186,274

[22] Filed: Sep. 11, 1980

[51] Int. Cl.³ ............................................. E01H 5/09
[52] U.S. Cl. ..................................... 37/257; 56/11.4;
74/197; 74/480 R; 192/3.54; 474/86; 474/118;
474/133
[58] Field of Search ................... 37/43 E, 43 R, 43 C,
37/43 G, 43 L, 126 AE, 126 AB, 244, 245, 246,
248, 249, 257; 74/197, 213, 200, 201, 491, 504,
471 R, 473 R, 480 B, 480 R; 474/86, 133, 136,
138, 172, 118; 192/11, 0.096, 0.098, 3.54;
56/11.4, 11.5, 11.6; 251/296, 215

[56] References Cited

U.S. PATENT DOCUMENTS

| 1,342,966 | 6/1920 | McCutchan | 251/296 X |
|---|---|---|---|
| 2,918,109 | 12/1959 | Schliephacke | 74/471 R X |
| 2,935,891 | 5/1960 | Morse | 74/471 X |
| 2,960,199 | 11/1960 | Morse | 74/471 X |
| 3,580,351 | 5/1971 | Mollen | 37/43 E X |
| 3,757,596 | 9/1973 | McCanse | 74/491 |
| 3,808,717 | 5/1974 | Schantz | 37/126 A E X |
| 3,938,400 | 2/1976 | Konyha | 37/43 R X |
| 4,058,957 | 11/1977 | Roseberry | 192/11 X |
| 4,062,135 | 12/1977 | Dobberpuhl | 37/43 R |
| 4,288,060 | 9/1981 | Mittell | 251/215 |

FOREIGN PATENT DOCUMENTS

| 31744 | 11/1961 | Finland | 251/296 |
|---|---|---|---|
| 556403 | 10/1943 | United Kingdom | 37/126 AB |

Primary Examiner—Edgar S. Burr
Assistant Examiner—Moshe I. Cohen

[57] ABSTRACT

A snowblower is disclosed having an engine, a friction disc rotatably driven by the engine, the friction disc including a friction surface and being rotatable about a first axis, a driven disc rotatable about an axis transverse to said first axis, the driven disc including a peripheral edge engageable with the friction surface, and being drivingly connected to the snowblower wheels for driving the wheels when the driven disc is driven by the friction disc. The snowblower also includes controls for controlling driving connection of the engine and an auger and for controlling driving connection of the engine and the wheels, the controls causing engagement of the auger drive before engagement of the traction drive and disengagement of the traction drive before disengagement of the auger drive.

25 Claims, 8 Drawing Figures

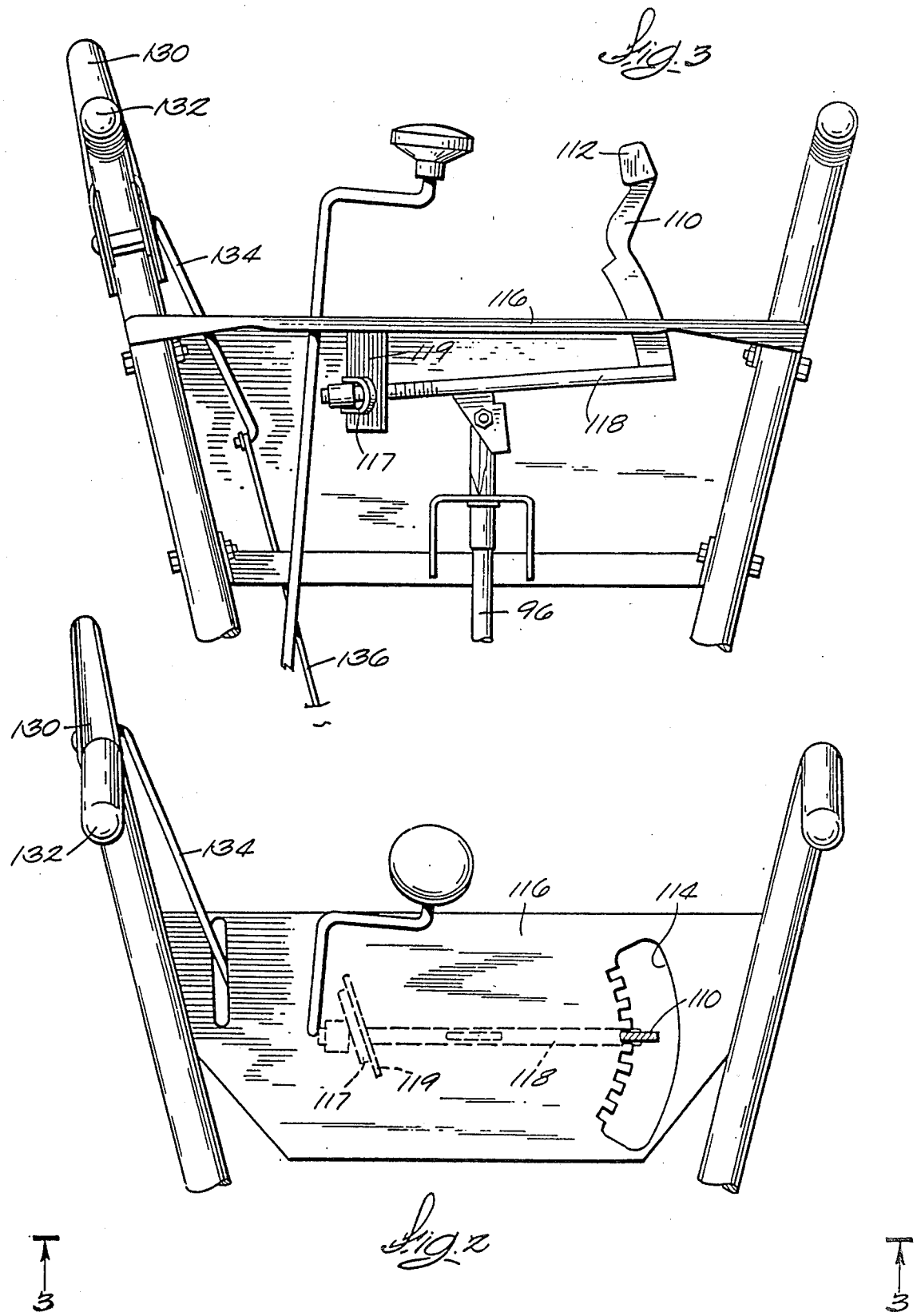

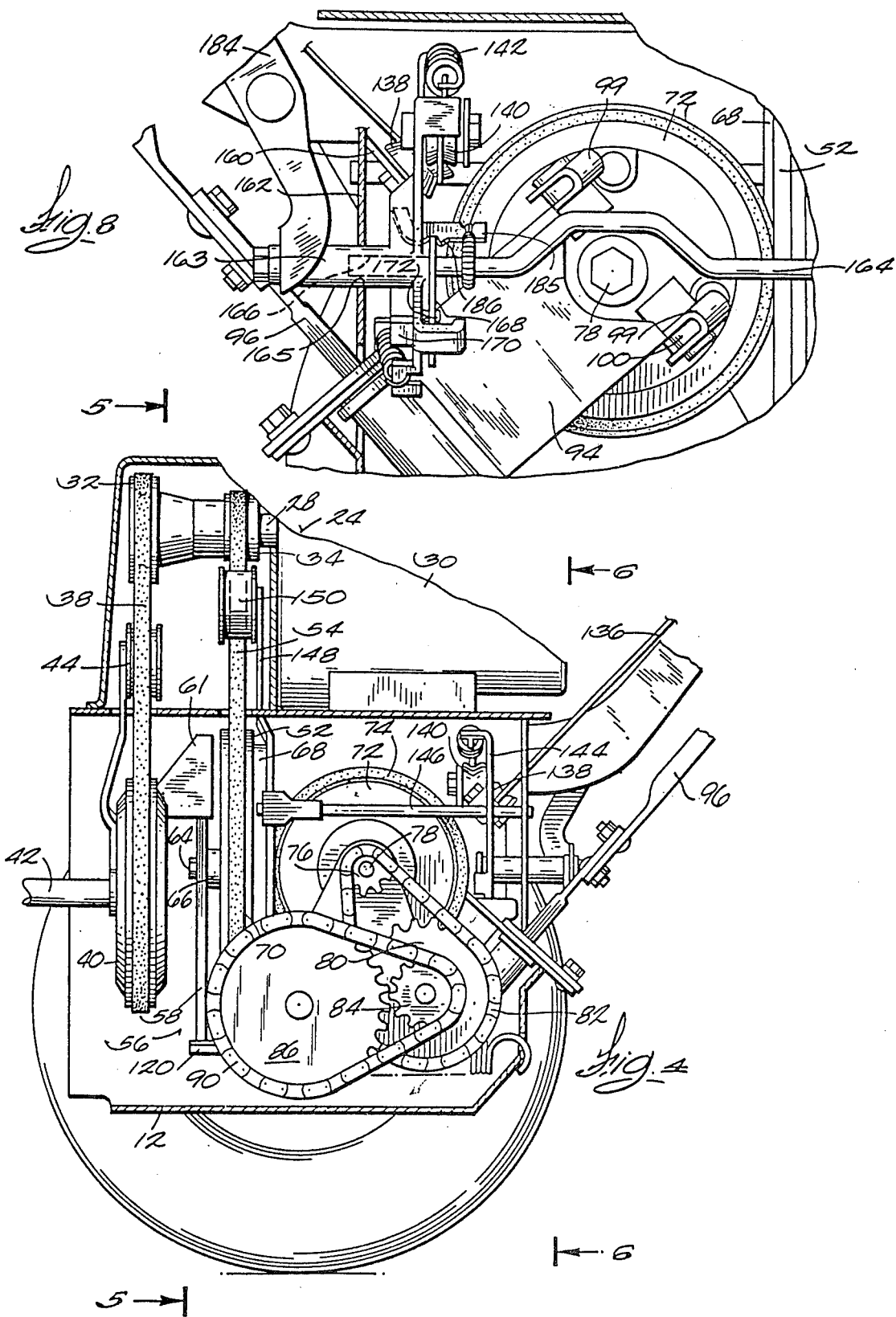

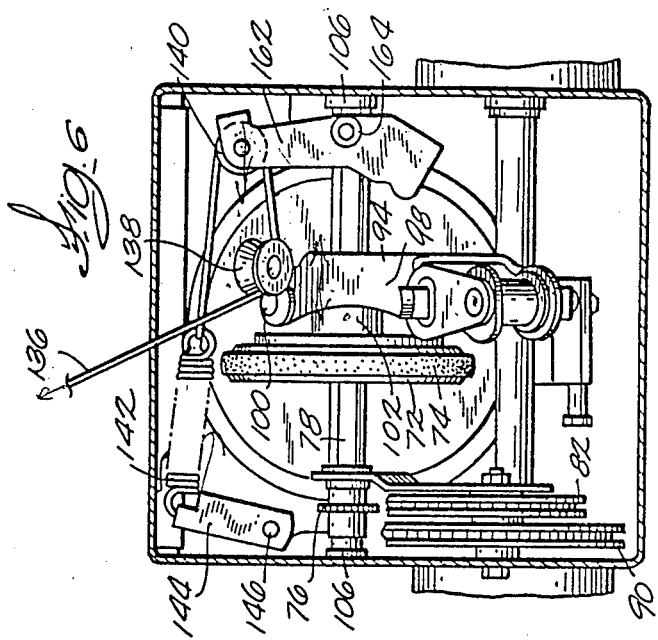
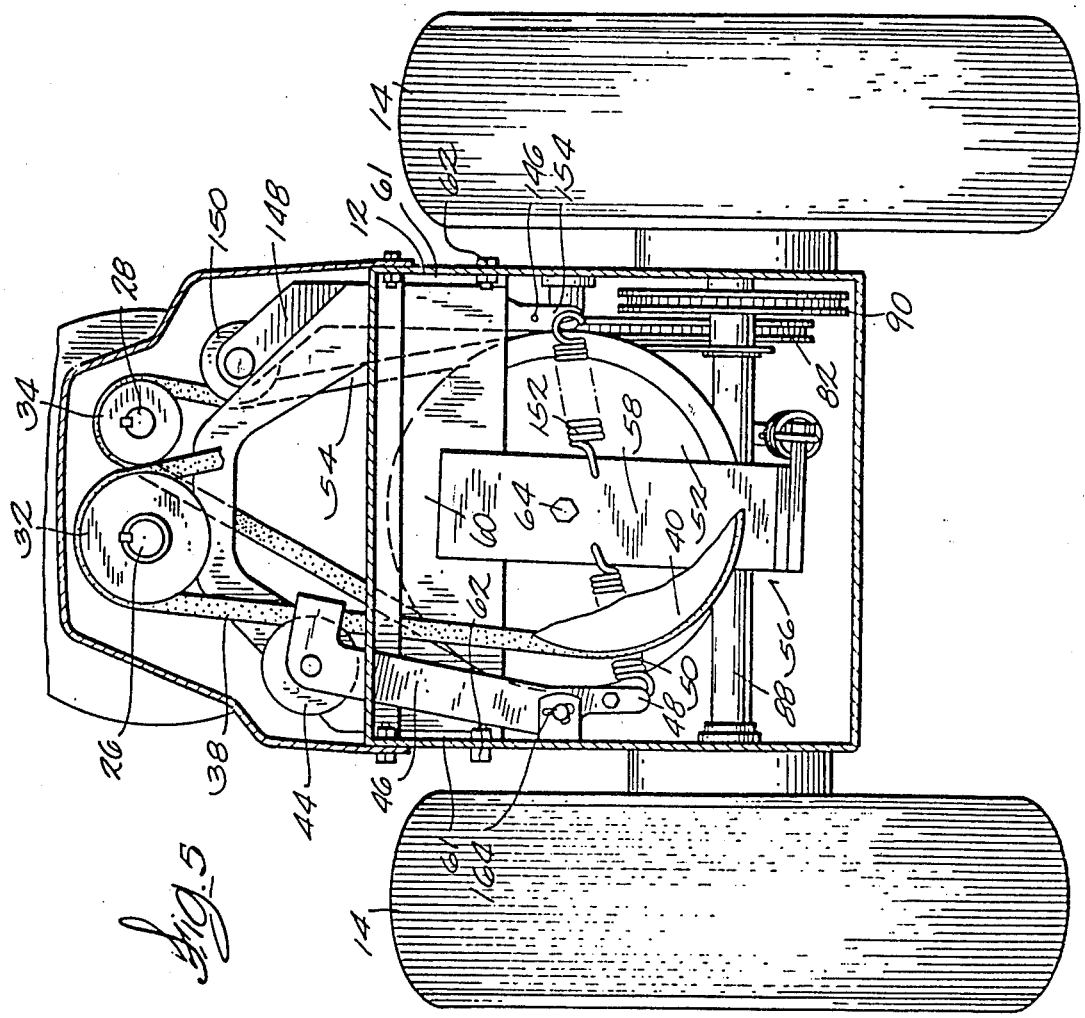

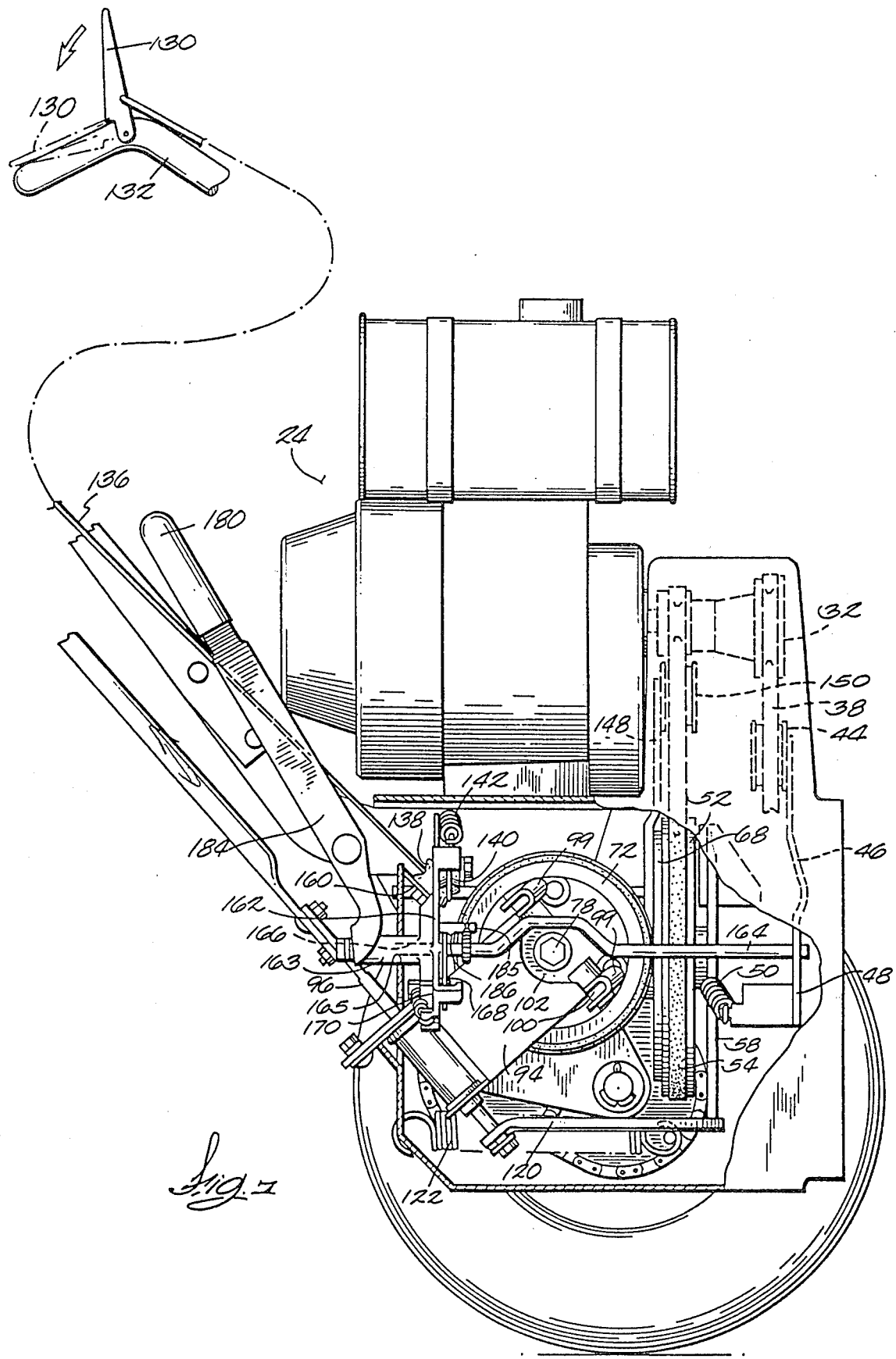

SNOWBLOWER HAVING IMPROVED AUGER AND TRACTION DRIVE CONTROL

FIELD OF THE INVENTION

The present invention is related to snowblowers and more particularly to an improved auger and traction drive mechanism therein as well as a new control means for the auger and traction drives.

BACKGROUND OF THE INVENTION

Prior art snowblowers which have included both an auger drive and a traction drive system commonly employ relatively complex constructions for transmitting the engine output to the auger and to the wheels. Additionally, engagement of the auger prior to engagement of the traction drive has found to be a desirable feature to avoid inadvertent blockage of the auger housing or of the snow discharge chute. If the traction drive is engaged prior to the auger, it is then possible that snow will be forced into the auger housing thereby clogging the auger housing and the discharge chute and preventing subsequent actuation of the snowblower. Prior art units have employed devices such as electrical interlocks in the auger and traction drive controls in order to provide for engagement of the auger for the traction drive, but such electrical interlocks required complicated assemblies and substantial expense in construction.

Another of the features of prior art snowblowers is that the controls of such snowblowers have been relatively complicated. The present invention proposes a simplified control mechanism for use in operating the snowblower wherein only two control handles are provided for the auger and traction drive mechanism. The invention also provides an improved drive mechanism which includes means for insuring engagement of the auger prior to the traction drive.

It has also been found that it is desirable in snowblower constructions to include a drive control which is spring actuated in such a way as to stop the operation of the machine in the event that the operator releases his grip of a control handle. Accordingly, the invention described is particularly constructed so as to include a unique control mechanism for both the auger and traction drive systems and wherein both the auger and traction drive will cease in the event the operator releases his grip on the control.

SUMMARY OF THE INVENTION

The invention includes a snowblower having a frame, at least one wheel for supporting the frame for movement along the ground, and means for propelling snow including a rotatable auger supported by the frame. An engine is supported by the frame, the engine including a first rotationally driven output shaft, and a second rotationally driven output shaft. Means are provided for selectively drivingly connecting the first output shaft to the auger for rotatably driving the auger and for selectively drivingly connecting the second output shaft of the engine to the wheel for driving the wheel. Means are further provided for controlling driving connection of the engine and the auger and for controlling driving connection of the engine and the wheel, the controlling means including means for causing engagement of the auger drive before engagement of the traction drive and disengagement of the traction drive before disengagement of the auger drive.

One of the features of the invention is the provision in the means for controlling driving connection of the engine to the auger and to the wheel of a single control lever movable to a first position causing driving engagement of the engine and the auger and a second position causing driving engagement of the engine and the wheel.

Another of the features of the invention is the provision in the means for drivingly connecting the engine and the auger of a first drive belt, means for tensioning the drive belt including a first movable member movable between a first position and a belt tensioning position, a second drive belt, and means for tensioning the second drive belt including a second movable member movable between a first position and a belt tensioning position, and wherein the means for controlling driving connection includes a pulley means connected to the first movable member and a cable having one end connected to the second movable member and being reaved over the pulley means.

Another of the features of the invention is the provision in the means for controlling driving connection of a control handle supported by the frame for pivotable movement, the cable being connected to the control handle and causing pivotal movement of the first movable member to the first drive belt tensioning position when the control handle is moved to a first position and causing movement of the second movable member to a belt tensioning position when the handle moves past the first position to a second position.

Another of the principal features of the invention is the provision in the means for controlling driving connection of means for selectively disengaging the means for drivingly connecting the engine to the auger, and wherein the pulley means is supported on a lever, a shaft supporting the lever, the lever being movable between a first axial position on the shaft to a second axial position. The means for selectively disengaging includes lever means for moving the first lever between the first position and the second axial position, and means for transmitting pivotal movement of the lever to the first movable member when the first lever is in the first position.

The invention also includes a snowblower having a frame, at least one wheel for supporting the frame for movement along the ground, means for propelling snow including a rotatable auger supported by the frame, and an engine supported by the frame. Means are provided for selectively drivingly connecting the engine to the auger for rotatably driving the auger. Means are further provided for selectively drivingly connecting the engine to the wheel for driving the wheel, the means for connecting the engine to the wheel including a friction disc rotatably driven by the engine, the friction disc including a friction surface, and the friction disc being rotatable about a first axis. A driven disc is rotatable about an axis transverse to the first axis and includes a peripheral edge engageable with the friction surface. The driven disc is drivingly connected to the wheels for driving the wheels when the driven disc is driven by the friction disc. Means are also provided for controlling driving connection of the engine and the auger and for controlling driving connection of the engine and the wheel, the controlling means including means for causing engagement of the auger drive before engagement of the traction drive and disengagement of the traction drive before disengagement of the auger drive.

Another of the features of the invention is the further provision in means for controlling driving connection of the output shaft and the wheel of a shift and declutch rod supported for rotation about its longitudinal axis and for reciprocal movement in the direction of its longitudinal axis. Means are also provided for causing movement of the friction disc away from the driven disc when the rod is moved in the direction of its longitudinal axis and for causing movement of the driven disc in the direction of the axis of rotation of the driven disc in response to rotation of the shift and declutch rod.

Another of the features of the invention is the provision in the means for drivingly connecting the engine to the wheel of means for supporting the driven disc for movement in the direction of the axis of rotation of the driven disc and from a first position wherein the driven disc engages a portion of the friction surface of the friction disc on one side of the axis of rotation of the friction disc and wherein the traction drive is in a forward driving mode to a second portion of the friction surface of the friction disc and on an opposite side of the axis of rotation of the friction disc and wherein the traction drive is in a reverse driving mode.

The invention also includes an apparatus having a frame, at least one wheel for supporting the frame for movement along the ground, a rotatable member supported by the frame, and an engine supported by the frame. Means are provided for selectively drivingly connecting the engine to the rotatable member for rotatably driving the rotatable member. Means are also provided for selectively drivingly connecting the engine to the wheel for driving the wheel. Also included are means for controlling driving connection of the engine and the rotatable member and for controlling driving connection of the engine and the wheel, the controlling means including means for causing engagement of the rotatable member drive before engagement of the traction drive and disengagement of the traction drive before disengagement of the rotatable member drive.

Various other advantages and features of the invention are set forth in the following description, in the drawings and in the claims.

BRIEF DESCRIPTION OF THE DRAWINGS

FIG. 2 is a partial view from the rear of the snowblower illustrating the control means of the snowblower.

FIG. 3 is a view taken along line 3—3 in FIG. 2.

FIG. 4 is a partial cross section elevation view from the left side of the snowblower shown in FIG. 1.

FIG. 5 is a cross section view taken generally along line 5—5 in FIG. 4.

FIG. 6 is a cross section view taken generally along line 6—6 in FIG. 4.

FIG. 7 is a partial cross section elevation view from the right side of the snowblower shown in FIG. 1.

FIG. 8 is an enlarged detailed view of a portion of the structure shown in FIG. 7.

Figure 1:
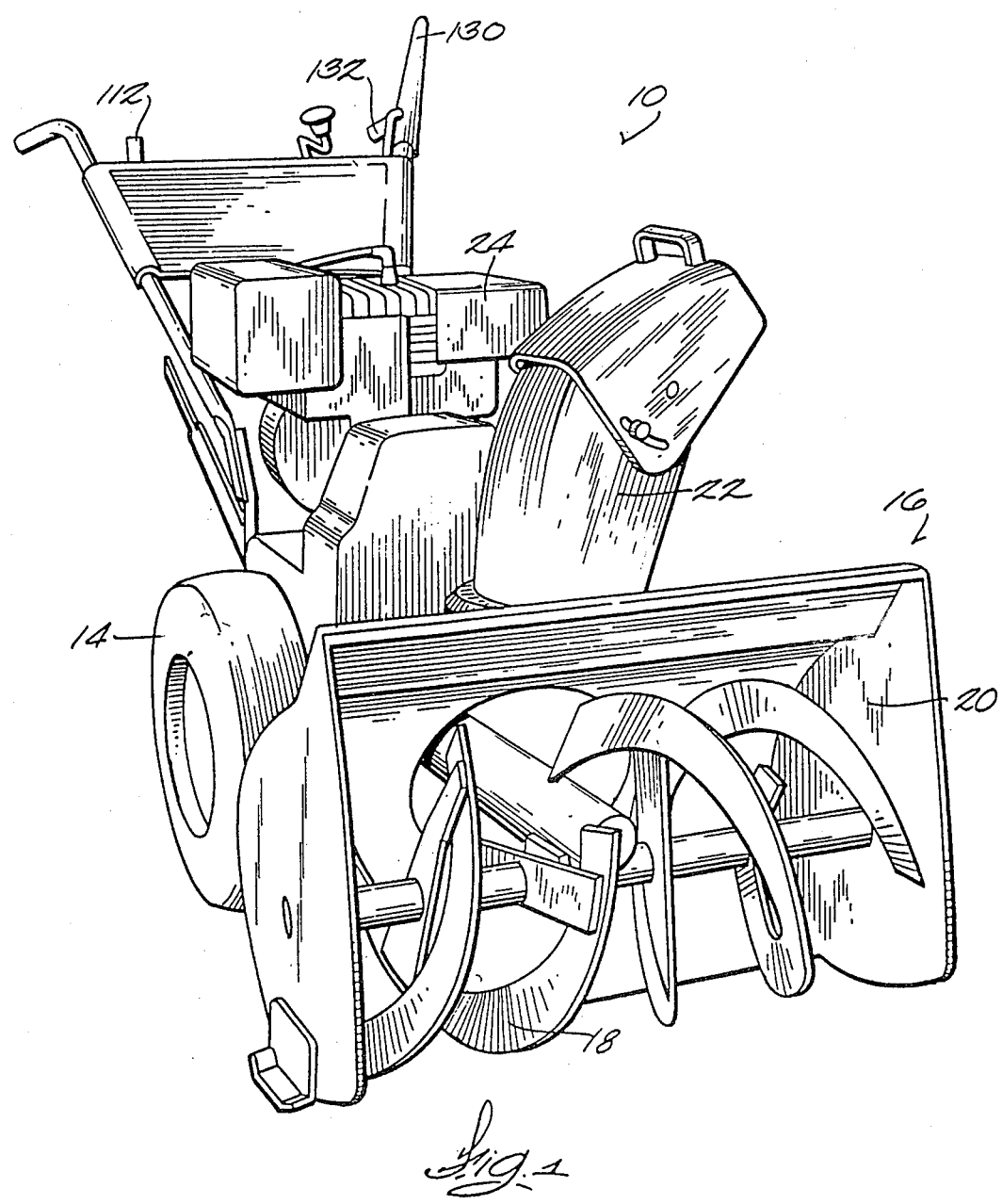
FIG. 1 is a perspective view of a snowblower embodying the invention.

Before describing a preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

DESCRIPTION OF A PREFERRED EMBODIMENT

Illustrated in the drawings is a snowblower 10 embodying the present invention and including a rigid frame 12 (FIG. 3) supported for movement by a pair of ground engaging wheels 14. An auger assembly 16 is mounted on a forward portion of the frame 12 and includes a rotatably driven generally horizontal auger 18 mounted in an auger housing 20, the auger 18 being adapted to propel snow upwardly from the auger housing 20 and through a discharge chute 22. The snowblower also includes an engine 24 which is supported by the frame 12 and is adapted to rotatably drive the auger 18 and to also drive the wheels 14. The engine 24 is mounted on the frame 12 such that the crankshaft 26 and the camshaft 28 (FIGS. 4-5) project forwardly from the engine block 30. The crankshaft 26 supports a first drive pulley 32 which, as will be described more fully hereinafter, is employed to drive the auger 18 of the snowblower. The camshaft 28, which is driven at one half the speed of the crankshaft 26, supports a second pulley 34, that pulley being drivingly connected to traction drive means.

AUGER DRIVE

Referring now to the means for drivingly connecting the engine crank shaft 26 to the auger 18, a drive belt 38 (FIG.4) is supported by the first drive pulley 32 and drives a driven pulley 40, the driven pulley 40 being supported on an auger drive shaft 42. The auger drive shaft 42 is connected through conventional gearing means to the auger 18 for rotatably driving the auger. The tension of the drive belt 38 is controlled by an auger drive belt idler pulley 44, the idler pulley being supported by a pivotable idler arm 46. The idler arm 46 is pivotable from a position wherein the tension of the pulley 44 is sufficient to cause driving of the auger 18 and to a second position wherein the drive belt 38 is not driven by the drive pulley 32. As illustrated in FIG. 5, the idler arm 46 supporting the idler pulley 44 includes a downwardly extending end 48 having a coil spring 50 connected thereto and biasing the upper end of the idler arm 46 to a position wherein the idler pulley 44 is in its second position and the auger drive is in a neutral mode.

TRACTION DRIVE

The traction drive mechanism includes a drive pulley 34 supported by the camshaft 28, and adapted to drive a driven pulley 52 by means of a drive belt 54. The driven pulley 52 is supported by a pivotable bracket assembly 56 comprising a generally vertically extending plate 58 welded to a transverse supporting plate 60 (FIG. 5). The transverse plate 60 is supported at its opposite ends for pivotable movement about a horizontal axis. More particularly, the opposite ends of the transverse plate 60 are supported by a pair of brackets 61. Bolts 62 extend through apertures in the brackets 61 and through the frame 12 and permit pivotal movement of the transverse plate 60. The driven pulley 52 is supported for rotation by a bolt 64 which extends through a central aperture in the vertically extending plate 58. A hub 66 is supported by the bolt 64, and the hub 66 rotatably supports the driven pulley 52.

The traction drive mechanism also includes a friction disc or wheel 68 which is bolted to the rearward surface 70 of the driven pulley 52. The friction disc 68 is driven with the driven pulley 52 and is rotatable about its axis of rotation. The friction disc 68 is intended to rotatably drive a driven disc 72 which is mounted for rotation about a horizontal axis generally perpendicular to the horizontal axis of the friction disc 68. In the illustrated construction, the peripheral edge 74 of the driven disc 72 is comprised of rubber to facilitate the frictional drive of the friction disc 68 and driven disc 72. The driven disc 72 is supported in a manner which will be described more particularly hereinafter such that rotation of the friction disc 68 will be imparted to the driven disc 72 whereby the driven disc 72 may drive the ground engaging wheels 14. The means for drivingly connecting the driven disc 72 to the ground engaging wheels includes a small diameter sprocket 76. The samll diameter sprocket 76 is fixedly connected to a rotatable shaft 78 supporting the driven disc 72 and is thereby positively driven by the driven disc 72.

The traction drive also includes a large diameter sprocket 80 which is rotatably supported by the frame 12. The large diameter sprocket 80 is driven by a chain 82 and in turn drives a small diameter sprocket 84 which is fixedly connected to the large diameter sprocket 80 for rotation therewith. A large diameter sprocket 86 is mounted on the axle 88 of the snowblower in such a manner as to be adapted to drive the ground engaging wheels. The large diameter sprocket 86 is driven by a chain 90 extending around the small diameter sprocket 84.

Mean are also provided for supporting the driven disc 72 in selective engagement with the friction disc 68 and for movement in a direction generally along the axis of rotation of the driven disc 72 and such that the driven disc 72 can move from a position wherein a portion of its periphery engages the center of the friction disc 68 to a position spaced from the center of the friction disc 68 whereby the driven disc 72 is driven in a first rotational direction by the friction disc 68 and to a position wherein the driven disc 72 engages the friction disc 68 at a point on an opposite side of the axis of the friction disc 68 whereby the driven disc 72 is driven in an opposite rotational direction. As will be readily appreciated by those skilled in the art, as the driven disc 72 is moved away from the axis of rotation of the friction disc 68, and if the speed of the friction disc 68 remains constant, the speed of the driven disc 72 will be increased. Additionally, when the driven disc 72 is moved from one side of the axis of rotation of the friction disc 68 to the other side of the friction disc, the rotational direction of the driven disc 72 will be reversed. Accordingly, the wheels 14 of the snowblower can be driven in a forward direction when the driven disc 72 engages one side of the friction disc 68 and in reverse when the driven disc is moved to the other side of the axis of rotation of the friction disc. Additionally, the speed of rotation of the wheels 14 can be increased in the forward and reverse driving modes by moving the driven disc 72 away from the axis of rotation of the friction disc.

The means for moving the driven disc 72 includes a generally planar lever arm 94 (FIGS. 6–7) extending upwardly and forwardly, the lever arm 94 having a lower end connected to a shift and declutch rod or control shaft 96 as will be described and an upper end which causes movement of the driven disc 72 parallel to its axis of rotation and across the face of the friction disc 68. More specifically, the upper end of the lever arm 94 comprises a channel member having a pair of spaced sides 98. The sides 98 at the upper end of the lever arm 94 include integrally joined flanges 99 which pivotally support a shaft 100, and the shaft 100, in turn pivotally supports a collar 102. The collar 102 is slideable along the hexagonal shaft 78 and supports the driven disc 72 for movement along the shaft 78. The shaft 78 is supported for rotation at its opposite ends by a pair of bearings 106 (FIG. 6), the bearings being supported by the frame 12. The driven disc 72 is thus supported for slideable movement along the shaft 78 and such that its axis of rotation remains parallel to the face of the friction disc 68 even as the upper end of the lever arm 94 moving the driven disc 72 moves through an arcuate path.

A single control lever 110 is provided for causing engagement and disengagement of the traction drive mechanism and for controlling the forward and reverse operating modes of the traction drive as well as of the speed of the traction drive in both forward and reverse directions. The control lever 110 includes a handle 112 which extends upwardly through an arcuate slot 114 in the control panel 116, and the control lever 110 is constructed such that the handle 112 can be movable toward and away from the snowblower operator and in an arcuate path in the slot 114 in the control panel. The control lever 110 includes one end which supports the handle 112 and an opposite end which is connected to the free end of a lever arm 118. The lever arm 118 is connected intermediate its opposite ends to the upper end of the declutch rod 96. The end of the lever arm 118 opposite that connected to control lever 110 is housed in a slot 117 in a bracket 119. The end of the lever arm 118 housed in slot 117 is movable through a limited range of movement about the axis of shift and declutch rod 96 but is restrained against movement toward and away from the panel 116. As previously mentioned, the shift and declutch rod 96 includes a lower end which extends through a bore in the lower end of the lever arm 94. The lower end of shift and declutch rod 96 is connected to the lever arm 94 by a splined connection in such a manner that the rod 96 is movable in the direction of its longitudinal axis with respect to the lever arm 94 but rotation of the shaft 96 is imparted to the lever arm 94.

The lower end of the shaft 96 is also connected to a rearward end of a generally horizontal declutch plate 120 (FIG. 7). The declutch plate 120 includes an opposite end which is welded or otherwise rigidly joined to the lower end of the vertically extending plate 58 supporting the driven pulley 52 and the friction disc 68. As previously stated, the vertically extending plate 58 is supported for pivotal movement about a horizontal transverse axis such that the driven pulley 52 and friction disc 68 are movable in an arcuate path downwardly and away from the driven disc 72. Such movement of the friction disc 68 is effected by downward movement of the control shaft 96 in the direction of its longitudinal axis. Such movement of the control shaft 96 causes the rearward end of the plate 120 to be moved downwardly whereby the plate 120 will cause the vertically extending plate 58 to rotate about the horizontal axis and cause the friction disc 68 to move downwardly and forwardly and to thereby swing away from the driven disc 72. Such movement of the friction disc is resisted by a coil spring having a rearward end attached to the frame 12 and a forward end which is attached to a forward end of the declutch plate 120 and adjacent the lower end of the vertically extending plate 58. Downward movement of the shift and declutch rod 96 is effected by pushing downwardly on handle 112. Since the end of the lever arm 118 opposite that end connected to the lever 110 is restrained in a slot 117, downward movement of handle 110 causes downward movement of the upper end of rod 96.

One of the features of the invention is that the controls provide for convenient operation of engagement and disengagement of the traction drive as well as the forward and reverse operating modes and relative speed with only a single control handle. By pushing downwardly on the control handle 112, the traction drive can be disengaged since the friction disc 86 is moved away from the driven disc 72. Arcuate movement of the control handle once the traction drive has been disengaged can then cause movement of the driven disc 72 in the direction of the axis of rotation of the shaft 78 to either a forward or reverse driving position and also change the relative speed of the traction drive.

Another of the features of the invention is that the traction drive arrangement effects a self engagement of the driven disc 72 with the friction disc 68 when the traction drive is in the forward driving mode. Accordingly, a relatively small coil spring 122 can be employed to maintain driving engagement of those discs. This self engagement of the driven disc with the friction disc is the result of two actions including the total belt tension due to the traction drive demands and the tendency for the friction disc 68 to climb up the driven disc 72 due to friction. Such self energizing capability of the drive mechanism in the forward speeds results in more draw bar pull without using a heavy disc or coil spring 122 and thereby permits a lower declutch effort and lighter operating controls.

AUGER AND TRACTION DRIVE CONTROL

Means are also provided for controlling the selective driving engagement of the auger drive means and the traction drive means and for selectively causing driving engagement of the auger 18 before the traction drive and for also disengaging the traction drive prior to disengagement of the auger drive. During operation of the snowblower 10, it is preferable that the auger 18 be operational whenever the traction drive is in operation to prevent snow from being forced into the auger housing and thereby clogging the housing or the auger discharge chute. The means for providing this advantage includes a second control handle 130 pivotally supported by the snowblower handle 132 and movable between a position shown in solid lines in FIG. 7 wherein there is no driving engagement of either the auger or traction drive and a position shown in phantom wherein driving connection to the auger and the traction drive is provided. Means are also provided for causing the auger drive to be engaged as the control lever 130 is moved from the first position toward the phantom position but at a point intermediate those two positions.

This control means includes a rod 134 which is connected to the control lever and a cable 136 connected to the lower end of the rod 134. Movement of the lever 130 from the solid line position to the phantom position causes tensioning of the cable 136. The cable 136 is reaved over a pair of pulleys 138 and 140 and is connected at its opposite end to a coil spring 142, the coil spring 142 being connected in turn to the upper end of a traction control lever 144.

The traction drive control lever 144 is rigidly connected at its lower end to a traction drive control shaft 146, the shaft 146 being supported by the frame 12 for rotation about its longitudinal axis and in such a manner that pivotal movement of the traction drive control lever 144 effects rotation of the shaft 146. The shaft 146 extends forwardly and is rigidly connected at its forward end to the traction drive idler arm 148. The traction drive idler arm 148 supports an idler pulley 150 and is biased away from a belt tensioning position. The biasing means is provided by a coil spring 152 attached to the lower end portion 154 of the idler arm 148 supporting the idler pulley 150.

In operation, when the control lever arm 130 is fully depressed against the handle bar 132, the cable 136 applies tension on the coil spring 142 thereby causing the lever arm 144 to cause pivotal movement of the control shaft 146 in the clockwise direction as seen in FIG. 6 and to thereby cause movement of the idler arm 148 and idler pulley 150 to a position wherein the tension of the drive belt 54 is increased and a driving connection is provided between the drive pulley 34 supported on the camshaft 28 and the traction drive driven pulley 52.

Referring now to the pulleys 138 and 140 supporting the control cable 136, the pulley 138 is supported by a bracket member 160 (FIG. 7) which is fixedly attached to the snowblower frame 12. The second pulley 140 is rotatably supported by the upper end of the lever arm 162, the lever arm 162 being adapted to control driving connection of the auger drive. The lower end of the lever arm 162 is integrally connected to a rotatable cylindrical member or shaft 163, the cylindrical member 163 being housed in a bore 165 in the frame and including a central longitudinally extending bore 166 in one of its ends, the bore 166 housing an end of a control shaft 164. The control shaft 164 extends forwardly from the bore 166 of the cylindrical member 163 and is fixedly connected at its forward end to the auger drive idler arm 46 supporting the auger drive idler pulley 44. The forwardly extending control shaft 164 is adapted to be rotatable about its longitudinal axis and the idler arm 46 supporting the auger driven idler pulley 44 is rigidly connected to the control shaft 164 in such a manner that its upper end moves arcuately in response to rotation of the control shaft. Means are also provided for transmitting pivotal movement of the lever arm 162, supporting the pulley 140 to the control shaft 164, whereby pivotal movement of the lever arm 162 is transmitted to the auger drive idler arm 46 to thereby effect tensioning of the auger drive belt 38. The transmitting means includes a driven lever 168 which is fixedly connected to the control shaft 164 for rotation therewith, the driven lever 168 extending downwardly from the rearward end of the control shaft 164. The lever arm 162 supporting the second pulley 140 also includes a downwardly extending arm portion 170, the lower end of that arm portion 170 including a projection 172 adapted to selectively engage the downwardly extending end of the driven lever 168. When the lever arm 162 supporting the second pulley 140 is caused to pivot in the counterclockwise direction as seen in FIG. 6, the projection 172 engages the lower end of the downwardly extending driven lever 168 thereby causing counterclockwise rotation of both the driven lever 168 and the auger drive control shaft 164. Such rotation of the auger drive control shaft 164 causes movement of the auger drive idler pulley 44 into a position where the drive belt 38 is tensioned. As previously stated, the auger drive idler arm 46 is biased in a counterclockwise direction, as viewed in FIG. 5, by a coil spring 50 having one end connected to an end 48 of the idler arm extending downwardly from the control shaft 164 and an opposite end being fixed.

In operation of the traction drive and auger drive control handle 130, depression of the control handle 130 causes tensioning of the cable 136 and this tensioning of the cable will first cause tensioning of the auger drive belt 38 and subsequent tensioning of the traction drive belt 54. Release of the handle 130 causes initial disengagement of the traction drive belt 54 and subsequently a decrease in the tension of the auger drive belt 38. When the control handle 130 is depressed thereby causing tension in the cable 136, the first effect of the tensioning of the cable 136 is to cause pivotal movement of the lever arm 162 supporting the second pulley 140. By reaving the cable over the two pulleys 138 and 140, a mechanical advantage is achieved against the second pulley 140 and the upper end of the lever arm 162. Once that lever arm 162 is moved to the position wherein the auger drive idler 44 tensions the auger drive belt 38 there wil be sufficient resistance to further movement of the lever arm 162 that the cable 136 will then cause pivotal movement of the lever arm 144 effecting pivotal movement of the traction drive idler arm 148. One of the features of the invention is that by reaving the cable 136 over the two pulleys 138 and 140, a block and tackle reduction is achieved and the cable 136 applies twice the force on the auger idler arm 46 as on the traction drive idler arm 148. This force difference is required because of the larger horsepower demands of the auger drive system. Secondly, the system also functions to effect initial engagement of the auger drive and then a subsequent engagement of the traction drive and positively requires engagement of the auger drive prior to engagement of the traction drive.

AUGER DRIVE DISENGAGEMENT

Means are further included for providing for disengagement of the auger drive to permit operation of the traction drive without operation of the auger drive and to thereby permit movement of the snowblower 10 without operation of the auger 18. Such disengagement of the auger 18 is effected by moving the auger engaging lever 180 (FIG. 7) forwardly. The auger engaging lever 180 is pivotably attached to the frame 12 for pivotal movement about a shaft 182 and includes a lower end 184 attached to the rearward end of the cylindrical member 163. The cylindrical member 163 is supported such that it can be movable forwardly and rearwardly, and forward movement of the auger engaging lever 180 will effect rearward movement of the cylindrical member 163. Such rearward movement of the cylindrical member 163 causes movement of the forwardly extending lug or projection 172 to a position rearwardly of the downwardly extending lever arm 168. When the lug 172 is in this rearward position, pivotal movement of the lever arm 162 supporting the second pulley 140 is not transmitted to the auger drive control shaft 164. Accordingly, when the control handle 130 is depressed, the tension in the control cable 136 will cause movement of the lever arm 162 but no movement of the auger drive idler arm 46.

A detent 185 is also provided for the auger engaging lever 180. The detent is fixedly attached to the lever arm 162 and includes a projection 186 engageable with the upper portion of the downwardly extending lever arm 168. A garter spring 188 surrounds the auger drive control shaft 164 and the detent 185 and is intended to maintain engagement of the detent 185 with the downwardly extending lever arm 168. Movement of the cylindrical member 163 with respect to the auger drive control shaft 164 will cause movement of the projection 186 from one side to the other side of the downwardly extending lever arm 168 and thereby provide a detent.

Various features of the invention are set forth in the following claims.

I claim:
1. A snowblower comprising
a frame,
at least one wheel for supporting the frame for movement along the ground,
means for propelling snow including a rotatable auger supported by said frame,
an engine supported by the frame, the engine including a first rotationally driven output shaft, and a second rotationally driven output shaft,
means for selectively drivingly connecting the first output shaft to the auger for rotatably driving the auger,
means for selectively drivingly connecting the second output shaft of the engine to the wheel for driving the wheel, and
means for controlling driving connection of said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including a control handle supported by said frame for pivotable movement, said cable being connected to said control handle and causing pivotal movement of said first movable member to said first drive belt tensioning position when said control handle is moved to a first position and causing movement of said second movable member to a belt tensioning position when said handle moves past said first position to a second position.
2. A snowblower comprising
a frame,
at least one wheel for supporting the frame for movement along the ground,
means for propelling snow including a rotatable auger supported by said frame, an engine supported by the frame, the engine including a first rotationally driven output shaft, and a second rotationally driven output shaft, means for selectively drivingly connecting the first output shaft to the auger for rotatably driving the auger, means for selectively drivingly connecting the second output shaft of the engine to the wheel for driving the wheel, and means for controlling driving connection of said engine and said auger and for controlling driving connection of said engine and said wheel, said controlling means including means for causing engagement of said auger drive before engagement of said traction drive and disengagement of said traction drive before disengagement of said auger drive, said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection including a control handle supported by said frame for movement from a first position to an auger drive belt tensioning position and to a traction drive belt tensioning position, said auger drive belt tensioning position being intermediate said first position and said traction drive belt tensioning position, said cable being connected to said control handle and causing movement of said first movable member to said auger drive belt tensioning position when said control handle moves to said auger drive belt tensioning position and causing movement of said second movable member to said traction drive belt tensioning position when said control handle is moved to said traction drive belt tensioning position.

3. A snowblower comprising
a frame,
at least one wheel for supporting the frame for movement along the ground,
means for propelling snow including a rotatable auger supported by said frame,
an engine supported by the frame, the engine including a first rotationally driven output shaft, and a second rotationally driven output shaft,
means for selectively drivingly connecting the first output shaft to the auger for rotatably driving the auger,
means for selectively drivingly connecting the second output shaft of the engine to the wheel for driving the wheel, and
means for controlling driving connection of said engine and said auger and for controlling driving connection of said engine and said wheel, said controlling means including means for causing engagement of said auger drive before engagement of said traction drive and disengagement of said traction drive before disengagement of said auger drive, said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including means for selectively disengaging said means for drivingly connecting said engine to said auger, and said pulley means being supported on a first lever, a shaft supporting said first lever, said first lever being movable between a first axial position on said shaft to a second axial position, said means for selectively disengaging including lever means for moving said first lever between said first position and said second axial position, and means for transmitting pivotal movement of said first lever to said first movable member when said first lever is in said first position.

4. A snowblower comprising
a frame,
at least one wheel for supporting the frame for movement along the ground,
means for propelling snow including a rotatable auger supported by said frame,
an engine supported by the frame,
means for selectively drivingly connecting the engine to the auger for rotatably driving the auger,
means for selectively drivingly connecting the engine to the wheel for driving the wheel, and
means for controlling driving connection of said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including a control handle supported by said frame for pivotable movement, said cable being connected to said control handle and causing pivotal movement of said first movable member to said first drive belt tensioning position when said control handle is moved to a first position and causing movement of said second movable member to a belt tensioning position when said handle moves past said first position to a second position.

5. A snowblower comprising
a frame,
at least one wheel for supporting the frame for movement along the ground,
means for propelling snow including a rotatable auger supported by said frame,
an engine supported by the frame,
means for selectively drivingly connecting the engine to the auger for rotatably driving the auger,
means for selectively drivingly connecting the engine to the wheel for driving the wheel, and
means for controlling driving connection of said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, said means for controlling driving connection including a control handle supported by said frame for movement from a first position to an auger drive belt tensioning position and to a traction drive belt tensioning position, said auger drive belt tensioning position being intermediate said first position and said traction drive belt tensioning position, said cable being connected to said control handle and causing movement of said first movable member to said auger drive belt tensioning position when said control handle moves to said auger drive belt tensioning position and causing movement of said second movable member to said traction drive belt tensioning position when said control handle is moved to said traction drive belt tensioning position.

6. A snowblower comprising
a frame,
at least one wheel for supporting the frame for movement along the ground,
means for propelling snow including a rotatable auger supported by said frame,
an engine supported by the frame,
means for selectively drivingly connecting the engine to the auger for rotatably driving the auger,
means for selectively drivingly connecting the engine to the wheel for driving the wheel, and
means for controlling driving connection of said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, said means for controlling driving connection further including means for selectively disengaging said means for drivingly connecting said engine to said auger, and wherein said pulley means is supported on a lever, a shaft supporting said lever, said lever being movable between a first axial position on said shaft to a second axial position, said means for selectively disengaging including lever means for moving said first lever between said first position and said second axial position, and means for transmitting pivotal movement of said lever to said first movable member when said first lever is in said first position.

7. A snowblower comprising
a frame,
at least one wheel for supporting the frame for movement along the ground,
means for propelling snow including a rotatable auger supported by said frame,
an engine supported by the frame,
means for selectively drivingly connecting the engine to the auger for rotatably driving the auger,
means for selectively drivingly connecting the engine to the wheel for driving the wheel, said means for connecting the engine to the wheel including a friction disc rotatably driven by said engine, said friction disc including a friction surface, and said friction disc being rotatable about a first axis, a driver disc rotatable about an axis transverse to said first axis, said driven disc including a peripheral edge engageable with said friction surface, and means for drivingly connecting said driven disc to said wheels for driving said wheels when said driven disc is driven by said friction disc,
means for controlling driving connection of said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including a control handle supported by said frame for pivotable movement, said cable being connected to said control handle and causing pivotal movement of said first movable member to said first drive belt tensioning position when said control handle is moved to a first position and causing movement of said second movable member to a belt tensioning position when said handle moves past said first position to a second position.

8. An apparatus comprising
a frame,
at least one wheel for supporting the frame for movement along the ground,
a rotatable member supported by the frame,
an engine supported by the frame,
means for selectively drivingly connecting the engine to the rotatable member for rotatably driving the rotatable member,
means for selectively drivingly connecting the engine to the wheel for driving the wheel, and
means for controlling driving connection of said engine and said rotatable member and for controlling driving connection of said engine and said wheel, said controlling means including means for causing engagement of the rotatable member drive before engagement of the traction drive and disengagement of the traction drive before disengagement of the rotatable member drive,
said means for drivingly connecting the engine and the rotatable member including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including a control handle supported by said frame for pivotal movement, said cable being connected to said control handle and causing pivotal movement of said first movable member to said first drive belt tensioning position when said control handle is moved to a first position and causing movement of said second movable member to a belt tensioning position when said handle moves past said first position to a second position.

9. An apparatus comprising
a frame,
at least one wheel for supporting the frame for movement along the ground,
a rotatable member supported by the frame,
an engine supported by the frame,
means for selectively drivingly connecting the engine to the rotatable member for rotatably driving the rotatable member,
means for selectively drivingly connecting the engine to the wheel for driving the wheel, and
means for controlling driving connection of said engine and said rotatable member and for controlling driving connection of said engine and said wheel, said controlling means including means for causing engagement of the rotatable member drive before engagement of the traction drive and disengagement of the traction drive before disengagement of the rotatable member drive,
said means for drivingly connecting the engine and the rotatable member including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection including a control handle supported by said frame movement from a first position to a rotatable member drive belt tensioning position and to a traction drive belt tensioning position, said rotatable member drive belt tensioning position being intermediate said first position and said traction drive belt tensioning position, said cable being connected to said control handle and causing movement of said first movable member to said rotatable member drive belt position when said control handle moves to said rotatable member drive belt tensioning position and causing movement of said second movable member to said traction drive belt tensioning position when said control handle is moved to said traction drive belt tensioning position.

10. An apparatus comprising
a frame,
at least one wheel for supporting the frame for movement along the ground,
a rotatable member supported by the frame,
an engine supported by the frame,
means for selectively drivingly connecting the engine to the rotatable member for rotatably driving the rotatable member,
means for selectively drivingly connecting the engine to the wheel for driving the wheel, and
means for controlling driving connection of said engine and said rotatable member and for controlling driving connection of said engine and said wheel, said controlling means including means for causing engagement of the rotatable member drive before engagement of the traction drive and disengagement of the traction drive before disengagement of the rotatable member drive,
said means for drivingly connecting the engine and the rotatable member including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection fruther including means for selectively disengaging said means for drivingly connecting said engine to said rotatable member, and wherein said pulley means is supported on a lever, a shaft supporting said lever, said lever being movable between a first axial position on said shaft to a second axial position, said means for selectively disengaging including lever means for moving said first lever between said first position and said second axial position, and means for transmitting pivotal movement of said lever to said first movable member when said first lever is in said first position.

11. An apparatus comprising
a frame,
at least one wheel for supporting the frame for movement along the ground,
a rotatable member supported by said frame,
an engine supported by the frame,
means for selectively drivingly connecting the engine to the rotatable member for rotatable driving the rotatable member,
means for selectively drivingly connecting the engine to the wheel for driving the wheel, said means for connecting the engine to the wheel including a friction disc rotatably driven by said engine, said friction disc including a friction surface, and said friction disc being rotatable about a first axis, a driven disc rotatable about an axis transverse to said first axis, said driven disc including a peripheral edge engageable with said friction surface, and means for drivingly connecting said driven disc to said wheels for driving said wheels when said driven disc is driven by said friction disc,
means for controlling driving connection of said engine and said rotatable member and for controlling driving connection of said engine and said wheel, said controlling means including means for causing engagement of the rotatable member drive before engagement of the traction drive and disengagement of said traction drive before disengagement of said rotatable member drive,
said means for drivingly connecting the engine and the rotatable member including a drive belt, means for tensioning said drive belt including a first member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including a control handle supported by said frame for pivotable movement, said cable being connected to said control handle and causing pivotal movement of said first movable member to said first drive belt tensioning position when said control handle is moved to a first position and causing movement of said second movable member to a belt tensioning position when said handle moves past said first position to a second position.

12. A snowblower comprising
a frame,
at least one wheel for supporting the frame for movement along the ground,
means for propelling snow including a rotatable auger supported by said frame,
an engine supported by the frame,
means for selectively drivingly connecting the engine to the auger for rotatably driving the auger,
means for selectively drivingly connecting the engine to the wheel for driving the wheel, said means for connecting the engine to the wheel including a friction disc rotatably driven by said engine, said friction disc including a friction surface, and said friction disc being rotatable about a first axis, a driven disc rotatable about an axis transverse to said first axis, said driven disc including a peripheral edge engageable with said friction surface, and means for drivingly connecting said driven disc to said wheel for driving said wheel when said driven disc is driven by said friction disc,
means for controlling driving connection to said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection including a control handle supported by said frame for movement from a first position to an auger drive belt tensioning position and to a traction drive belt tensioning position, said auger drive belt tensioning position being intermediate said first position and said traction drive belt tensioning position, said cable being connected to said control handle and causing movement of said first movable member to said belt tensioning position when said control handle moves to said auger drive belt tensioning position and causing movement of said second movable member to said traction drive belt tensioning position when said control handle is moved to said traction drive belt tensioning position.

13. A snowblower as set forth in claim 12 and wherein the means for connecting the engine to the wheel further includes means for supporting said driven disc against the friction surface of said friction disc and for movement in the direction of the axis of rotation of said driven disc.

14. A snowblower as set forth in claim 12 wherein said means for drivingly connecting the engine to the wheel further includes means for supporting said driven disc for movement in the direction of the axis of rotation of the driven disc and from a first position wherein said driven disc engages a portion of said friction surface of said friction disc on one side of the axis of rotation of said friction disc and wherein said traction drive is in a forward driving mode to a second portion of said friction surface of said friction disc and on an opposite side of the axis of rotation of said friction disc and wherein said traction drive is in a reverse driving mode.

15. A snowblower comprising
a frame,
at least one wheel for supporting the frame for movement along the ground,
means for propelling snow including a rotatable auger supported by said frame,
an engine supported by the frame,
means for selectively drivingly connecting the engine to the auger for rotatably driving the auger,
means for selectively drivingly connecting the engine to the wheel for driving the wheel, said means for connecting the engine to the wheel including a friction disc rotatably driven by said engine, said friction disc including a friction surface, and said friction disc being rotatable about a first axis, a driven disc rotatable about an axis transverse to said first axis, said driven disc including a peripheral edge engageable with said friction surface, and means for drivingly connecting said driven disc to said wheel for driving said wheel when said driven disc is driven by said friction disc,
means for controlling driving connection of said engine and said auger and for controlling driving connection of said engine and said wheel, said controlling means including means for causing engagement of said auger drive before engagement of said traction drive and disengagement of said traction drive before disengagement of said auger drive,
said means for drivingly connecting the engine and the auger including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including means for selectively disengaging said means for drivingly connecting said engine to said auger, and said pulley means being supported on a lever, a shaft supporting said lever, said lever being movable between a first axial position on said shaft to a second axial position, said means for selectively disengaging including lever means for moving said first lever between said first position and said second axial position, and means for transmitting pivotal movement of said lever to said first movable member when said first lever is in said first position.

16. A snowblower as set forth in claim 15 and wherein the means for connecting the engine to the wheel further includes means for supporting said driven disc against the friction surface of said friction disc and for movement in the direction of the axis of rotation of said driven disc.

17. A snowblower as set forth in claim 15 and wherein said means for controlling driving connection of said output shaft and said wheel includes a shift and declutch rod supported for rotation about its longitudinal axis and reciprocal movement in the direction of its longitudinal axis, means for causing movement of said friction disc away from said driven disc when said rod is moved in the direction of its longitudinal axis, and means for causing movement of said driven disc in the direction of the axis of rotation of the driven disc in response to rotation of said shift and declutch rod.

18. A snowblower as set forth in claim 15 wherein said means for drivingly connecting the engine to the wheel further includes means for supporting said driven disc for movement in the direction of the axis of rotation of the driven disc and from a first position wherein said driven disc engages a portion of said friction surface of said friction disc on one side of the axis of rotation of said friction disc and wherein said traction drive is in a forward driving mode to a second portion of said friction surface of said friction disc and on an opposite side of the axis of rotation of said friction disc and wherein said traction drive is in a reverse driving mode.

19. An apparatus comprising
a frame,
at least one wheel for supporting the frame for movement along the ground,
a rotatable member supported by said frame,
an engine supported by the frame,
means for selectively drivingly connecting the engine to the rotatable member for rotatably driving the rotatable member,
means for selectively drivingly connecting the engine to the wheel for driving the wheel, said means for connecting the engine to the wheel including a friction disc rotatably driven by said engine, said friction disc including a friction surface, and said friction disc being rotatable about a first axis, a driven disc rotatable about an axis transverse to said first axis, said driven disc including a peripheral edge engageable with said friction surface, and means for drivingly connecting said driven disc to said wheel for driving said wheel when said driven disc is driven by said friction disc,
means for controlling driving connection of said engine and said rotatable member and for controlling driving connection of said engine and said wheel, said controlling means including means for causing engagement of the rotatable member drive before engagement of the traction drive and disengagement of said traction drive before disengagement of said rotatable member drive,
said means for drivingly connecting the engine and the rotatable member including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection including a control handle supported by said frame for movement from a first position to a rotatable member drive belt tensioning position and to a traction drive belt tensioning position, said rotatable member drive belt tensioning position being intermediate said first position and said traction drive belt tensioning position, said cable being connected to said control handle and causing movement of said first movable member to said rotatable member drive belt position when said control handle moves to said rotatable member drive belt tensioning position and causing movement of said second movable member to said traction drive belt tensioning position when said control handle is moved to said traction drive belt tensioning position.

20. An apparatus as set forth in claim 19 and wherein the means for connecting the engine to the wheel further includes means for supporting said driven disc against the friction surface of said friction disc and for movement in the direction of the axis of rotation of said driven disc.

21. An apparatus as set forth in claim 19 wherein said means for drivingly connecting the engine to the wheel further includes means for supporting said driven disc for movement in the direction of the axis of rotation of the driven disc and from a first position wherein said driven disc engages a portion of said friction surface of said friction disc on one side of the axis of rotation of said friction disc and wherein said traction drive is in a forward driving mode to a second portion of said friction surface of said friction disc and on an opposite side of the axis of rotation of said friction disc and wherein said traction drive is in a reverse driving mode.

22. An apparatus comprising
a frame,
at least one wheel for supporting the frame for movement along the ground,
a rotatable member supported by said frame,
an engine supported by the frame,
means for selectively drivingly connecting the engine to the rotatable member for rotatably driving the rotatable member,
means for selectively drivingly connecting the engine to the wheel for driving the wheel, said means for connecting the engine to the wheel including a friction disc rotatably driven by said engine, said friction disc including a friction surface, and said friction disc being rotatable about a first axis, a driven disc rotatable about an axis transverse to said first axis, said driven disc including a peripheral edge engageable with said friction surface, and means for drivingly connecting said driven disc to said wheel for driving said wheel when said driven disc is driven by said friction disc,
means for controlling driving connection of said engine and said rotatable member and for controlling driving connection of said engine and said wheel, said controlling means including means for causing engagement of the rotatable member drive before engagement of the traction drive and disengagement of said traction drive before disengagement of said rotatable member drive,
said means for drivingly connecting the engine and the rotatable member including a drive belt, means for tensioning said drive belt including a first movable member movable between a first position and a belt tensioning position, and said means for drivingly connecting the engine and the wheel including a second drive belt, and means for tensioning said second drive belt including a second movable member movable between a first position and a belt tensioning position, and said means for controlling driving connection including a pulley means connected to said first movable member and a cable having one end connected to said second movable member and being reaved over said pulley means, and said means for controlling driving connection further including means for selectively disengaging said means for drivingly connecting said engine to said rotatable member, and wherein said pulley means is supported on a lever, a shaft supporting said lever, said lever being movable between a first axial position on said shaft to a second axial position, said means for selectively disengaging including lever means for moving said first lever between said first position and said second axial position, and means for transmitting pivotal movement of said lever to said first movable member when said first lever is in said first position.

23. An apparatus as set forth in claim 22 and wherein the means for connecting the engine to the wheel further includes means for supporting said driven disc against the friction surface of said friction disc and for movement in the direction of the axis of rotation of said driven disc.

24. An apparatus as set forth in claim 22 and wherein said means for controlling driving connection of said output shaft and said wheel includes a shift and declutch rod supported for rotation about its longitudinal axis and reciprocal movement in the direction of its longitudinal axis, means for causing movement of said friction disc away from said driven disc when said rod is moved in the direction of its longitudinal axis, and means for causing movement of said driven disc in the direction of the axis of rotation of the driven disc in response to rotation of said shift and declutch rod.

25. An apparatus as set forth in claim 22 wherein said means for drivingly connecting the engine to the wheel further includes means for supporting said driven disc for movement in the direction of the axis of rotation of the driven disc and from a first position wherein said driven disc engages a portion of said friction surface of said friction disc on one side of the axis of rotation of said friction disc and wherein said traction drive is in a forward driving mode to a second portion of said friction surface of said friction disc and on an opposite side of the axis of rotation of said friction disc and wherein said traction drive is in a reverse driving mode.

* * * * *